United States Patent [19]

Tradowsky

[11] 4,375,132

[45] Mar. 1, 1983

[54] SLIDE FILING AND RETRIEVAL SYSTEM

[76] Inventor: Michael Tradowsky, 10370 Blair La., Kirtland, Ohio 44094

[21] Appl. No.: 265,850

[22] Filed: May 21, 1981

[51] Int. Cl.³ ............................................. G02B 27/02
[52] U.S. Cl. ..................................................... 40/361
[58] Field of Search ................... 40/361, 362, 367, 492

[56] References Cited

U.S. PATENT DOCUMENTS

| | | | |
|---|---|---|---|
| 1,172,426 | 2/1916 | Caldwell | 40/361 |
| 1,287,196 | 12/1918 | Black | 40/492 |
| 2,821,037 | 1/1958 | Westphal | 40/367 |

FOREIGN PATENT DOCUMENTS 732506  6/1955  United Kingdom .................. 40/367

*Primary Examiner*—Gene Mancene
*Assistant Examiner*—Wenceslao J. Contreras
*Attorney, Agent, or Firm*—Maky, Renner, Otto & Boisselle

[57] ABSTRACT

A slide filing and retrieval system characterized in the provision of a book-like file having vertical front and rear sidewalls between which a series of transparent slide carrier sheets are supported for selective swinging movement in a vertical plane through the open top and open end of the file to a viewing position above the open top of the file in front of the illuminated transluscent screen of a viewing stand on which the file is supported. The upper end of the viewing stand has a downwardly depending clamp to releasably clamp any selected slide carrier sheet in viewing position in front of the illuminated transluscent screen. Each slide carrier sheet has a plurality of pockets from and into which slides may be selectively withdrawn or inserted when the sheet is in clamped viewing position.

The file is further provided with non-swingable interleaf sheets interleaved between the slide carrier sheets to facilitate swinging in and swinging out of selected slide carrier sheets without interference by the pocket openings and edges of the slides therein.

3 Claims, 3 Drawing Figures

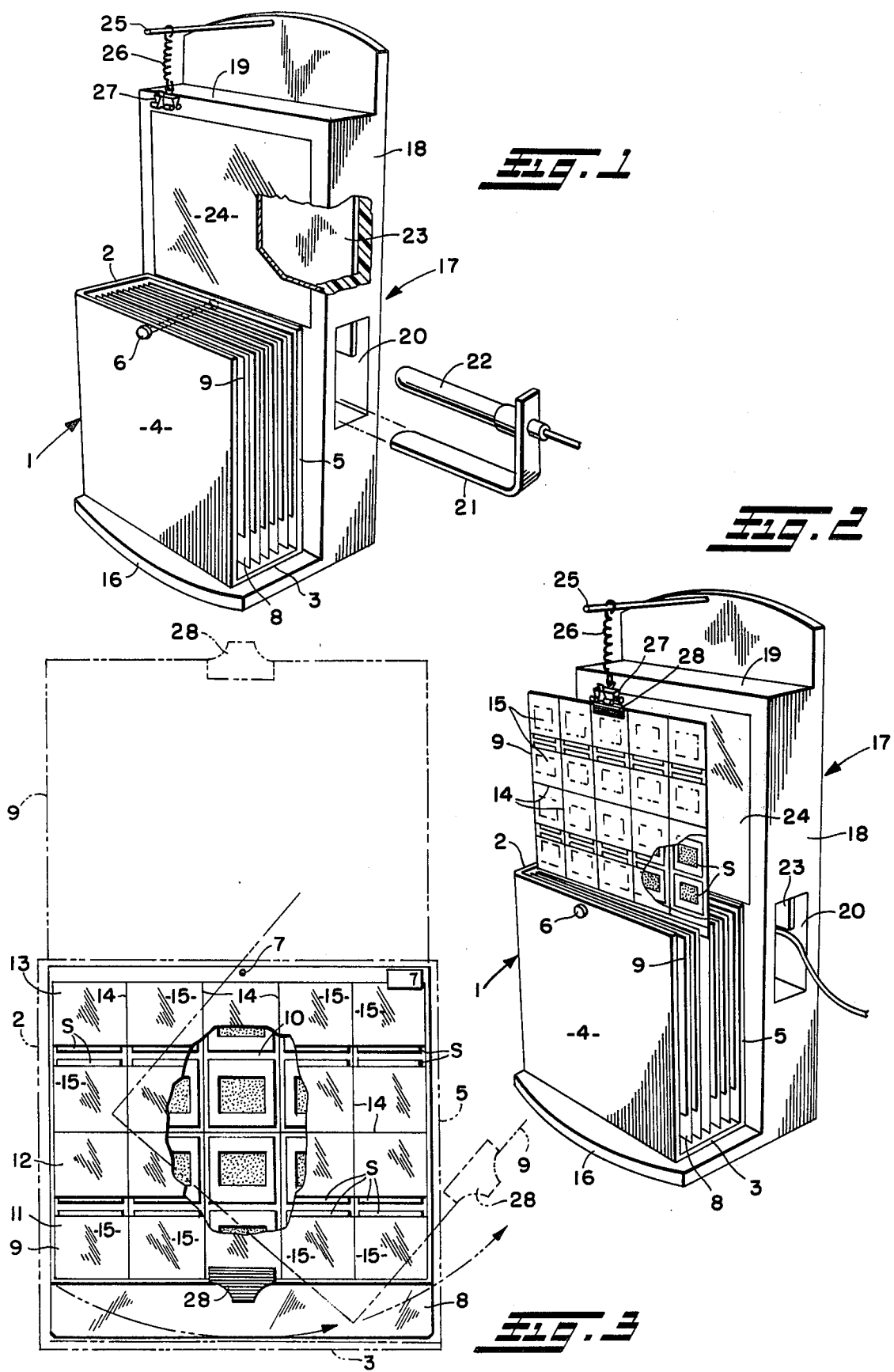

SLIDE FILING AND RETRIEVAL SYSTEM

BACKGROUND OF THE INVENTION

Known slide filing and retrieval systems generally comprise a series of relatively thick and rigid slide carrier frames which are slidable in tracks for selective withdrawal from a file or cabinet to a position in front of or above a vertical or horizontal illuminated viewing screen, each frame having pockets or other slide holding means for selective insertion or removal of slides thereinto or therefrom. In view of the tracks and the relatively thick frames a portable file or cabinet contains but a few frames whereas a file or cabinet containing a large number of frames becomes immobile.

It is also known to provide loose leaf albums for viewing slides in which selected slide carrier frames are positioned over an illuminated viewing screen, thereby requiring repeated insertion and withdrawal of the screen for each frame to be viewed.

SUMMARY OF THE INVENTION

In contradistinction to known slide filing and retrieval systems the system herein comprises portable book-like files stored on conventional shelves for selective removal for placement on a viewing stand, each file having a series of vertically disposed thin transparent slide-carrier sheets which are selectively swingable in a vertical plane out of the file to a viewing position in front of the illuminated viewing screen of the stand to provide access to the pockets of the swung-out sheet for selective insertion or withdrawal of slides thereinto or therefrom.

The viewing stand herein also has a clamp which releasably clamps any swung-out slide carrier sheet in vertical position parallel to the illuminated viewing screen.

Each file is provided with non-swingable interleaf sheets which are interleaved between the slide carrier sheets of facilitate swinging out and swinging in of any selected slide carrier sheet without interference by the pockets and slides of an adjacent slide carrier sheet.

BRIEF DESCRIPTION OF THE DRAWING

In said annexed drawing:

FIG. 1 is a perspective view of a slide filing and retrieval system showing a selected book-like file placed on a viewing stand, said file having therein a series of slide carrier sheets mounted on a hinge pin for selective swinging in a vertical plane out of and into the file;

FIG. 2 is a perspective view similar to FIG. 1, showing one of the slide carrier sheets swung out of the file and clamped in viewing position in front of the illuminated viewing screen of the viewing stand to provide access to the slide holding pockets of the slide carrier sheet for insertion or withdrawal of slides; and FIG. 3 is a front elevation view of a slide carrier sheet and a non-swingable interleaf sheet therebehind, the file and swung positions of the slide carrier sheet being shown in phantom lines.

DETAILED DESCRIPTION OF A PREFERRED EMBODIMENT

The slide filing and retrieval system herein comprises one or more book-like files 1 adapted to be stored on a conventional shelf, each file 1 comprising an end wall 2 bearing a file or volume number, a bottom wall 3, and parallel vertical front and rear side walls 4 and 5 defining an open end and an open top opposite the respective end and bottom walls 2 and 3.

Extending transversely across the upper middle portion of the walls 4 and 5 is a hinge pin 6 which passes through aligned openings 7 through the upper middle portion of a series of alternating interleaf sheets 8 and slide carrier sheets 9. The interleaf sheets 8 extend substantially to the bottom wall 3 so as to be non-swingably retained in the file 1, and the slide carrier sheets 9 terminate short of the bottom wall 3 to enable swinging out of any selected slide carrier sheet 9 from within the file 1 to a viewing position as shown in FIG. 2 and as shown in phantom lines in FIG. 3.

As best shown in FIG. 3, each slide carrier sheet 9 is transparent and may, for example, be fabricated from a base sheet 10 having spaced apart strips 11, 12 and 13 welded thereto along the edges of the base sheet 10 and along the criss-cross lines 14 to define pockets 15 of less than 2" depth to receive 2"×2" slides S. In the present case a 9"×11" sheet 9 has four rows of five pockets. The slide carrier sheets 9 are consecutively numbered as at the upper right corner. The slides S in each file 1 will bear a volume of file number, a slide carrier sheet number and a position number from 1 to 20 so that slides S identified in a catalog may be properly filed and may be selectively removed for use in a slide projector and then may be reinserted according to the file, carrier sheet, and position numbers thereon.

When it is desired to insert or withdraw slides S, the selected volume or file 1 is removed from a bookshelf (not shown) and placed on the base plate 16 of a viewing stand 17. The viewing stand 17 has a hollow upstanding portion 18 disposed behind the rear wall 5 of the file 1 and extending upwardly above the file 1 to form a light box 19 having an opening 20 to slidably receive a socket-carrying bracket 21 for a light bulb 22. The inside of the rear wall of the stand 17 has a white light diffusing panel 23 and the front of the light box 19 comprises a translucent or frosted sheet of plastic or glass to form an illuminated viewing screen 24 which is parallel to and behind a swung-out slide carrier 9 as shown in FIG. 2.

The upper end of the stand 17 has a forwardly extending horizontal rod 25 on which a coil spring 26 is slidable to position a spring clamp 27 for releasably clamping on the tab 28 of a swung-out slide carrier sheet 9 for holding the latter parallel to the screen 24.

With a selected slide carrier sheet 9 swung out of the file 1 as shown in FIG. 2 and as held by the clamp 27, desired slides S may be removed from one or more pockets 15 or slides S may be inserted into a particular one or more empty pockets 15. The clamp 27 may then be opened and the sheet 9 may be swung into the file 1. The interleaf sheets 8 facilitate swinging of the slide carrier sheets 9 so that the edges of the pockets 15 or edges of the slides S do not interfere with free swinging movement of the slide carrier sheets 9.

By way of example, the 9"×11" slide carrier sheets 9 with slides S therein are less than 1/16" in thickness whereby a file 1 of say 3" thickness between the front and rear walls 4 and 5 may easily accommodate 40 slide carrier sheets 9 and 40 interleaf sheets 8, i.e. a capacity of 800 slides S per file 1.

The rear end of the hinge pin 6 preferably has a screw therein (not shown) which screw, when removed, will permit retraction of the hinge pin 6 for adding or removing slide carrier sheets 9 and interleaf sheets 8.

The embodiments of the invention in which an exclusive property or privilege is claimed are defined as follows:

1. A slide filing and retrieval system comprising a portable book-like file having a series of vertically disposed rectangular slide carrier sheets therein; each carrier sheet having pockets for selective insertion or removal of slides thereinto or therefrom; said file having hinge means supporting said sheets for selective swinging movement in a vertical plane to a swung-out position from said file providing access to the pockets thereof; said file having a series of interleaf sheets nonswingably supported in said file; said interleaf sheets being interleaved between said slide carrier sheets to facilitate swinging movement of the latter out of and into said file.

2. A slide filing and retrieval system comprising a book-like file having one end wall, a bottom wall, and spaced-apart vertical front and rear sidewalls; a series of vertically disposed slide carrier sheets between said sidewalls; each sheet having a plurality of pockets from and into which slides may be selectively withdrawn or inserted; a hinge pin secured to said sidewalls to extend transversely therebetween through registering openings in said sheets for swinging out of any selected sheet in a vertical plane about said hinge pin through the top and other end of said file to a position providing access to the pockets of the swung-out sheet for insertion or withdrawal of slides thereinto or therefrom; and interleaf sheets having openings through which said hinge pin extends; said interleaf sheets being non-swingably retained in said file and being interleaved between said slide carrier sheets to facilitate swinging of said slide carrier sheets.

3. The system of claim 2 wherein said hinge pin is located at the upper middle portion of said front and rear walls for swinging of any selected slide carrier sheet to a position above the open top of said file; and wherein a viewing stand has a base plate on which said file is supported and has a rear upstanding portion including an illuminated viewing screen parallel to said rear sidewall and behind a swing-out slide carrier sheet; said upstanding portion, above said screen, having a horizontal rod spaced vertically above and parallel to said hinge pin; and a downwardly depending clamp slidable longitudinally along said rod for releasably clamping the upper edge portion of a swing-out slide carrier sheet to hold the latter in swung-out position parallel to said screen.

* * * * *